T. H. MALEY.
MACHINE FOR DIGGING ROOTS.
APPLICATION FILED JAN. 11, 1908.

911,417.

Patented Feb. 2, 1909.

2 SHEETS—SHEET 1.

INVENTOR
Thomas H. Maley
BY Munn & Co.
ATTORNEYS

WITNESSES

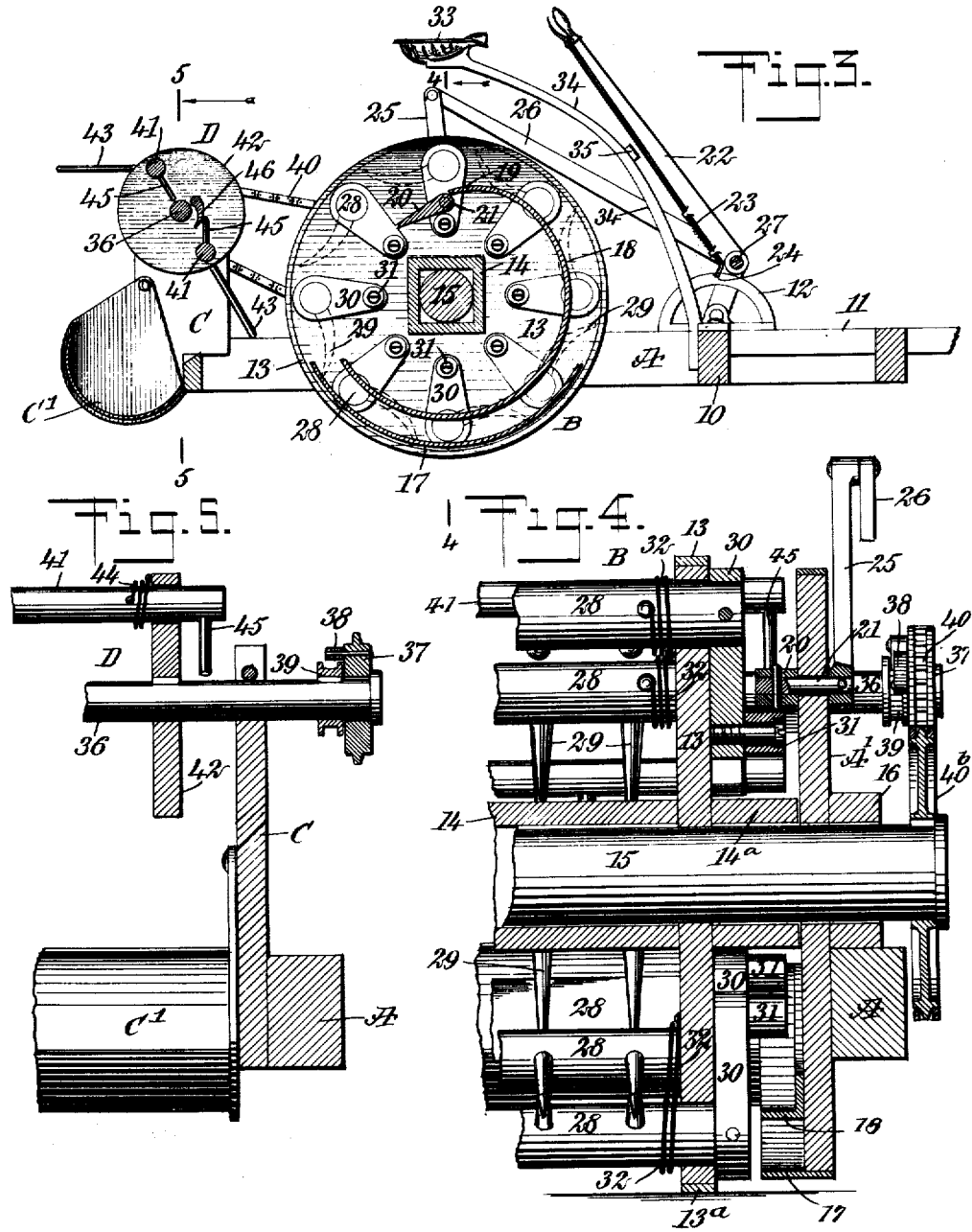

UNITED STATES PATENT OFFICE.

THOMAS H. MALEY, OF GOODHUE, MINNESOTA.

MACHINE FOR DIGGING ROOTS.

No. 911,417.    Specification of Letters Patent.    Patented Feb. 2, 1909.

Application filed January 11, 1908. Serial No. 410,384.

*To all whom it may concern:*

Be it known that I, THOMAS H. MALEY, a citizen of the United States, and a resident of Goodhue, in the county of Goodhue and State of Minnesota, have invented a new and useful Improvement in Machines for Digging Roots, of which the following is a full, clear, and exact description.

The purpose of the invention is to provide a machine especially adapted for eradicating the roots of quack grass, by which the roots are dug, conducted to the rear of the machine, and are there acted upon by strippers and delivered into a receptacle supported upon the frame of the machine at the rear.

It is a further purpose of the invention to so construct the machine that the frame will be supported by a digging cylinder, thus dispensing with extra supporting wheels, and wherein when the machine is in action, the digging teeth will enter the ground as the cylinder revolves, but wherein when the machine is to be transported from place to place, or when the machine is at rest, the teeth can be quickly and conveniently carried and made to lie within the line of the cylinder, and be as quickly and conveniently brought again into action.

Another purpose of the machine is to provide a spring-controlled stripping device driven by the rotation of the cylinder, and to curve the digging teeth in direction of the rear of the machine whereby they carry the roots that have been dug up, to the strippers, and finally it is a purpose of the invention to so construct the machine that it will be simple, durable, and light yet strong.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a plan view of the improved machine; Fig. 2 is a longitudinal section taken practically on the line 2—2 of Fig. 1, illustrating the position of the digging teeth when they are in action, and their controlling means; Fig. 3 is a section similar to Fig. 2, but illustrating the digging teeth as lying within the peripheral line of the cylinder; Fig. 4 is an enlarged vertical section taken practically on the line 4—4 of Fig. 3; and Fig. 5 is a vertical section taken practically on the line 5—5 of Fig. 3, the said Fig. 5 being also an enlarged view.

A represents the frame of the machine, which is preferably rectangular, and said frame is provided adjacent to its forward end with a cross bar 10, to which cross bar a pole 11 is secured, which pole extends a suitable distance beyond the forward end of the frame, and on the said cross bar 10 at its central portion, parallel racks 12 are secured. At the central portion of each side bar of the frame A, a circular cheek piece A' is secured, and between these cheek pieces A' a digging cylinder B is mounted to revolve. This digging cylinder consists of heads 13 that are spaced from the cheek pieces A' and are of greater diameter than the said cheek pieces, and the said heads are connected by a boxing 14 that has an extension 14ᵃ at the outer sides of the said heads, the extensions terminating short of the aforesaid cheek pieces A', as is illustrated in Fig. 4. A shaft 15 is passed through the said boxing and is secured to the heads 13, and the ends of the said shaft are passed loosely through the cheek pieces A' and are mounted to turn in bearings 16, that are secured to the upper faces of the side members of the frame A, as is also best shown in Fig. 4.

A segmental track 17 is secured to the inner face of each cheek piece A' adjacent to its lower edge, as is illustrated in Figs. 2 and 3, and a second track 18, also segmental, but longer, is located above each of the lower tracks 17, and the upper tracks extend from a point near the rear end portion of the lower tracks and are curved upward until they reach the upper central portion of the cheek pieces, where the tracks 18 are given a downward dip 19, as is also shown in Figs. 2 and 3, whereby a space intervenes the two tracks. At the upper end of each of the inner tracks 18 a switch 20 is located, and said switches are of wedge-shape, and each switch is attached to a pin 21, and said pins extend out through the cheek pieces A', as is shown in Fig. 4. The switches 20 are simultaneously operated by means of a lever 22, which is fulcrumed between the racks 12, and is provided with a thumb latch 23 that is adapted to enter notches 24 produced in the said racks 12, as is illustrated in Figs. 1, 2, and 3. Crank arms 25 extend from the pins 21 at their outer ends, and these crank arms are connected by links 26 with a forward cross bar 27, which cross bar passes through and is attached to the said lever 22; thus by moving the lever backward or forward, the switch 20 can be raised or lowered, as will be apparent by referring to Figs. 2 and 3.

A series of shafts or rods 28 are mounted to turn in the heads 13 of the digging cylinder B, and each shaft or rod 28 is provided with a series of digging fingers 29, which are curved in the direction of rotation of the cylinder and are pointed. At the outer end of each shaft or rod 28, a crank arm 30 is secured, and each crank arm 30 is provided with a friction roller 31, and the said friction roller when the machine is in operation, is adapted to travel between the tracks 17 and 18 and in engagement with the outer face of the tracks 18, as is shown in Fig. 2, and when the machine is not in operation, the friction rollers 31 are grouped around the boxing 14 within the field surrounded by the inner track 18, as is illustrated in Fig. 3.

When the switch 20 is carried to the downward position shown in Fig. 2, and the machine advances, the cylinder B acting as the supporting wheel for the machine, the friction rollers 31 engage with the upper face of the downwardly inclined switch 20, causing the said friction rollers to engage with the outer face of the inner track 18, and as the cylinder revolves, to enter the space between the two tracks 17 and 18, and when released from said tracks the crank arms are carried inward, as is shown at the upper portion of Fig. 2, and this is done through the medium of springs 32, that are secured to the said shafts or rods 28 adjacent to their ends, the said springs being also secured to the said heads 13, as is best shown in Fig. 4. These springs tend to normally carry the rods or shafts 28 to such a position that the digging teeth or fingers 29 carried thereby will occupy a position within the peripheral line of the cylinder when the crank arms 30 are free. When the machine is not in operation, then the switch 20 is carried to the upper position shown in Fig. 3, and as the cylinder turns, the friction rollers 31 of the said crank arms will engage with the under face of the switch 20 and will be directed to the inner surface of the inner track 18, or adjacent to said inner surface, as is shown in Fig. 3, and at such time the springs 32 act to draw the digging teeth or fingers 29 within the peripheral line of the cylinder, enabling the machine to be readily transported from place to place. The driver's seat 33 is located over the central portion of the digging cylinder, as is shown in Figs. 1, 2, and 3, and is supported by a bifurcated standard 34 provided with foot supports 35.

In connection with the digging cylinder B, I employ a stripping device D, which is located at the rear end of the frame, and this stripping device is adapted to take the roots as they are dug and carried up by the digging teeth or fingers 29, from said teeth and deposit said roots in a receptacle C' that is located at the rear end of the machine and is attached to standards C that extend from said rear end at each of its sides.

In the upper end portion of the standards C, a shaft 36 is mounted to turn, and this shaft at the left-hand side of the machine extends beyond the standard at that point, and is provided at said extended end with a sprocket wheel 37 provided with a dog 38 that engages with a ratchet wheel 39 secured on said shaft, as is shown in Figs. 1 and 5. A chain belt 40 is passed over the sprocket wheel 37 and likewise over a larger sprocket wheel 40$^b$, secured at the left-hand end of the shaft 15, since said shaft at its left-hand end extends out beyond the side of the frame, as is particularly shown in Fig. 1.

This stripping mechanism or device consists of heads 42 that are secured to the shaft 36, and in the said heads, shafts or rods 41 are mounted to turn, the said shafts or rods being provided with fingers 43 that extend therefrom and are located at right angles thereto, and springs 44 are secured to the said rods or shafts, and to the said heads, which springs serve to hold the fingers 43 in the position shown at the left of the head 42 in Fig. 2, but said fingers are rocked laterally when engaged by the segmental projections 46 into the position shown at the bottom of the said heads, in the same figure, when they pass between the digging fingers or teeth 29, as is particularly shown in Fig. 2, and at such time the springs 44 are placed under tension. This is accomplished by locating pins 45 at the ends of the rods or shafts 41, which end portions of the shafts extend beyond the outer faces of the heads 42, and as the shaft 36 is revolved, these pins are brought in engagement with segmental projections 46 that are secured to the inner faces of the standards C, adjacent to the forward edges of said standards, as is illustrated particularly in Figs. 2 and 3.

Thus in the operation of the machine, if the switch is set as is shown in Fig. 2, and the machine is drawn forward, the friction rollers 31 carried by the crank arms 30 will engage with the outer face of the inner track 18, bringing the fingers or teeth 29 to digging position, the cylinder traveling upon the surface, while the teeth 29 enter the ground and dig up the roots. The roots are retained by the teeth as the cylinder further revolves, and as the teeth are carried forward and rearward, the stripping mechanism being in constant operation, the fingers 43 of one of the shafts or rods 41 will have been thrown forward, and by reason of the pins 45 on said shaft engaging the projections 46, the fingers 43, as the stripping mechanism continues to revolve, will remove or strip the roots from the teeth or fingers 29 and throw them into the receptacle C', since when the pins 45 leave the projections 46, the springs 44 of the shafts or rods 41 in action will assert themselves and will throw the fingers 43 rearward. Should any material escape at such action, it will be received and caught by the next row of teeth on the ascent.

This machine is exceedingly light, it is durable, and it is economical in construction, and will effectively perform the work of digging roots of all kinds, but the machine is particularly adapted for digging up the roots of quack grass.

Having thus described my invention, I claim as new and desire to secure by Letters Patent,—

1. In root digging machines, the combination of a frame, opposing circular cheek pieces carried by the frame, concentric and spaced tracks including an outer and an inner one, the outer track being shorter than the inner one, and located at the lower portion of the cheek pieces, the inner track of each cheek piece extending over the outer track to a point near the top portion of said cheek pieces, switches located at the upper terminal portions of the inner tracks, and means for simultaneously moving said switches, a cylinder adapted as a support for the frame, said cylinder being rotatably mounted between the cheek pieces and comprising connected heads, spring controlled shafts mounted to revolve in the heads of the cylinder, crank arms at the ends of the shafts, and provided with means for engaging the tracks, and switches on the cheek pieces.

2. In root digging machines, the combination with a frame, opposing cheek pieces carried by the frame, concentric and spaced tracks, both tracks being located at the bottom of said cheek pieces, the inner track being longer and carried to the upper portion of the cheek pieces, switches located at the upper ends of the longer tracks, and means for simultaneously operating said switches, of a cylinder that supports the frame, mounted to revolve between the cheek pieces, shafts mounted to turn in the heads of the cylinder, digging teeth secured to the shafts, and crank arms at the ends of the shafts adapted for engagement with the said tracks and switches.

3. In root digging machines, the combination with a frame, opposing circular cheek pieces carried by the frame, concentric and spaced tracks including an outer and an inner one, the outer track being shorter than the inner one, and located at the lower portion of the cheek pieces, the inner track of each cheek piece extending over the outer track to a point near the top portion of said cheek piece, switches located at the upper terminal portions of the inner tracks, and means for simultaneously moving said switches, of a cylinder adapted as a support for the frame, said cylinder being rotatably mounted between said cheek pieces and comprising connected heads, spring-controlled shafts mounted to revolve in the heads of the said cylinder, crank arms at the ends of the said shafts, friction rollers carried by the said crank arms for an engagement with the said tracks, and switches on the cheek pieces, teeth secured to the said shafts and curved in the direction of forward rotation thereof, and a stripping device for the teeth carried by the cylinder, and means for operating the said stripping device by the rotation of the said cylinder.

In testimony whereof I have signed my name to this specification in the presence of two subscribing witnesses.

THOMAS H. MALEY.

Witnesses:
MINER C. MORGAN,
FRED J. EPPEN.